United States Patent
Ko et al.

(10) Patent No.: US 8,594,235 B2
(45) Date of Patent: Nov. 26, 2013

(54) APPARATUS AND METHOD FOR TRANSMITTING DATA USING TRANSMISSION DIVERSITY IN WIRELESS COMMUNICATION SYSTEM

(75) Inventors: Hyun Soo Ko, Gyeongki-do (KR); Seung Hee Han, Gyeongki-do (KR); Jea Hoon Chung, Gyeongki-do (KR); Bin Chul Ihm, Gyeongki-do (KR); Moon Il Lee, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 181 days.

(21) Appl. No.: 13/000,958

(22) PCT Filed: Jun. 5, 2009

(86) PCT No.: PCT/KR2009/003027
§ 371 (c)(1),
(2), (4) Date: Dec. 22, 2010

(87) PCT Pub. No.: WO2009/157660
PCT Pub. Date: Dec. 30, 2009

(65) Prior Publication Data
US 2011/0222588 A1    Sep. 15, 2011

Related U.S. Application Data

(60) Provisional application No. 61/075,754, filed on Jun. 26, 2008, provisional application No. 61/081,377, filed on Jul. 16, 2008, provisional application No. 61/088,353, filed on Aug. 13, 2008.

(30) Foreign Application Priority Data

Apr. 13, 2009   (KR) .................. 10-2009-0031930

(51) Int. Cl.
*H04L 27/04*    (2006.01)

(52) U.S. Cl.
USPC ........................ 375/299; 375/347; 375/267

(58) Field of Classification Search
USPC .................................. 375/299, 347
See application file for complete search history.

(56) References Cited

U.S. PATENT DOCUMENTS 6,888,809 B1 *  5/2005  Foschini et al. ............... 370/334
7,881,247 B2    2/2011  Pan et al.
(Continued)

FOREIGN PATENT DOCUMENTS

KR    10-2001-0076252    8/2001
KR    2005-0069802       7/2005
(Continued)

OTHER PUBLICATIONS

USPTO—Office Action for U.S. Appl. No. 13/000,706—Issued on Mar. 20, 2013.
(Continued)

*Primary Examiner* — Qutbuddin Ghulamali
(74) *Attorney, Agent, or Firm* — Morgan, Lewis & Bockius LLP (57) ABSTRACT

An apparatus for transmitting data in a wireless communication system is provided. The apparatus includes a data processor for generating modulation symbols by coding information bits and by constellation-mapping the coded information bits, a transmission (TX) processor for generating transmission symbols by applying any one of first and second transmission diversity schemes to the modulation symbols and for configuring a subframe including the transmission symbols, and a plurality of antennas for transmitting the subframe. The subframe comprises a plurality of slots and has a varying frequency band every slot by frequency hopping.

11 Claims, 9 Drawing Sheets

(56) References Cited

U.S. PATENT DOCUMENTS

| | | |
|---|---|---|
| 8,068,555 B2 | 11/2011 | Jongren et al. |
| 8,095,143 B2 * | 1/2012 | Amirijoo et al. .......... 455/452.1 |
| 2003/0139139 A1 | 7/2003 | Onggosanusi et al. |
| 2004/0077378 A1 | 4/2004 | Kim et al. |
| 2005/0265280 A1 | 12/2005 | Roh et al. |
| 2006/0067421 A1 | 3/2006 | Walton et al. |
| 2007/0004465 A1 | 1/2007 | Papasakellariou et al. |
| 2007/0115795 A1 | 5/2007 | Gore et al. |
| 2007/0189151 A1 | 8/2007 | Pan et al. |
| 2007/0211822 A1 | 9/2007 | Olesen et al. |
| 2008/0032746 A1 | 2/2008 | Olesen et al. |
| 2008/0056117 A1 | 3/2008 | Muharemovic et al. |
| 2008/0080472 A1 | 4/2008 | Bertrand et al. |
| 2008/0080637 A1 | 4/2008 | Khan et al. |
| 2008/0089441 A1 | 4/2008 | Hwang et al. |
| 2008/0095252 A1 | 4/2008 | Kim et al. |
| 2008/0117999 A1 | 5/2008 | Kadous et al. |
| 2008/0165891 A1 | 7/2008 | Budianu et al. |
| 2008/0279170 A1 | 11/2008 | Malladi et al. |
| 2008/0307427 A1 | 12/2008 | Pi et al. |
| 2009/0073922 A1 | 3/2009 | Malladi et al. |
| 2009/0202016 A1 | 8/2009 | Seong et al. |
| 2009/0262856 A1 | 10/2009 | Onggosanusi et al. |
| 2009/0279447 A1 | 11/2009 | Mehta et al. |
| 2010/0091903 A1 | 4/2010 | Castelain et al. |
| 2010/0091919 A1 | 4/2010 | Xu et al. |
| 2010/0111209 A1 | 5/2010 | Frenger |
| 2011/0228728 A1 | 9/2011 | Baligh et al. |

FOREIGN PATENT DOCUMENTS

| | | |
|---|---|---|
| KR | 2006-0048106 | 5/2006 |
| KR | 10-0698199 B | 3/2007 |
| KR | 10-0785806 B | 12/2007 |
| KR | 2008-0025260 | 3/2008 |
| KR | 10-0899735 B | 5/2009 |
| WO | 03/085876 | 10/2003 |
| WO | 2008-054322 A2 | 5/2008 |

OTHER PUBLICATIONS

U.S. Office Action for U.S. Appl. No. 13/001,219 dated Oct. 25, 2012.

International Search Report from related technology PCT Application No. PCT/KR2009/003037, May 6, 2009.

C. Ciochina et al., "Single-Carrier Space-Frequency Block Coding Performance Evaluation", IEEE 66th Vehicular Technology Conference, 2007, pp. 715-719, Sep. 30-Oct. 3, 2007.

International Search Report from PCT/KR2009/003487, Feb. 17, 2010.

International Search Report from PCT/KR2009/003466, Feb. 18, 2010.

International Search Report from PCT/KR2009/003026, Jan. 20, 2010.

International Search Report from PCT/KR2009/003012, Jan. 13, 2010.

International Search Report from PCT/KR2009/003027, Jan. 18, 2010.

U.S. Office Action (U.S. Appl. No. 13/058,488), dated Nov. 15, 2012.
U.S. Office Action (U.S. Appl. No. 13/000,470), dated Nov. 29, 2012.
USPTO—Office Action—Non-Final for U.S. Appl. No. 13/000,546—Issued on Feb. 8, 2013.
USPTO—Office Action for U.S. Appl. No. 13/001,219—Issued on Feb. 15, 2013.

* cited by examiner

APPARATUS AND METHOD FOR TRANSMITTING DATA USING TRANSMISSION DIVERSITY IN WIRELESS COMMUNICATION SYSTEM

The present application is a national stage of PCT International Application No. PCT/KR2009/003027, filed Jun. 5, 2009, and claims the benefit of U.S. Provisional Application Nos. 61/075,754, filed Jun. 26, 2008, 61/081,377, filed Jul. 16, 2008, 61/088,353, filed Aug. 13, 2008. The present national stage application also claims the benefit of Korean Patent Application No. 10-2009-0031930, filed Apr. 13, 2009.

BACKGROUND OF THE INVENTION

1. Field of the Invention

The present invention relates to wireless communication, and more particularly, to an apparatus and method for transmitting data using transmission diversity in a wireless communication system.

2. Discussion of the Related Art

Recently, a demand for wireless data service is abruptly increasing. Evolution from wireless voice service towards wireless data service requires a gradual increase of the wireless capacity. Such requirement enables wireless service providers and wireless equipment manufacturers to try to improve the data transmission rate of wireless systems and gives them a motive to do active research.

A wireless channel experiences several problems, such as path loss, shadowing, fading, noise, a limited bandwidth, a limit power of a terminal, and interference between users. Such a limit makes the wireless channel have a form similar to a narrow pipe which hinders the fast flow of data and also makes it difficult to design an efficient bandwidth of wireless communication which provides high-speed data transmission. Other challenges in the design of a wireless system include resource allocation, mobility issues related to a rapidly changing physical channel, portability, and the design of providing security and privacy.

If an additional version or replica of a transmitted signal is not received when a transmission channel experiences deep fading, it makes it difficult for a receiver to determine the transmitted signal. Resources corresponding to the additional version or replica are called diversity. The diversity is one of the most important factors which contribute to reliable transmission over wireless channels. If the diversity is employed, the capacity or reliability of data transmission can be maximized. A system implementing diversity using multiple transmission antennas and multiple reception antennas is referred to as Multiple Input Multiple Output (MIMO), and the MIMO system is also called a multiple-antenna system.

In the MIMO system, schemes for implementing diversity include Space Frequency Block Code (SFBC), Space Time Block Code (STBC), Cyclic Delay Diversity (CDD), Frequency Switched Transmit Diversity (FSTD), Time Switched Transmit Diversity (TSTD), Precoding Vector Switching (PVS), Spatial Multiplexing (SM), Generalized Cyclic Delay Diversity (GCDD), and Selective Virtual Antenna Permutation (S-VAP) and the like.

Meanwhile, one of systems taken into consideration in systems after the third generation is an Orthogonal Frequency Division Multiplexing (OFDM) system capable of attenuating the inter-symbol interference effect through low complexity. In the OFDM system, serial input data is converted into an N number of parallel data, carried on an N number of orthogonal subcarriers, and then transmitted. The subcarriers maintain orthogonality in the frequency domain. Orthogonal Frequency Division Multiple Access (OFDMA) refers to a multiple-access method of realizing multiple-access by independently providing some of available subcarriers to each user in a system using the OFDM method as a modulation method.

However, one of the major problems of the OFDM/OFDMA systems is that the Peak-to-Average Power Ratio (PAPR) may be very high. The PAPR problem is that the peak amplitude of a transmission signal is very greater than the average amplitude. The PAPR problem is caused by the fact that an OFDM symbol is the overlapping of an N number of sinusoidal signals on different subcarriers. The PAPR is related to the capacity of the battery and problematic in a terminal which is sensitive to power consumption. In order to reduce power consumption, the PAPR needs to be lowered.

One of systems proposed to lower the PAPR is a Single Carrier-Frequency Division Multiple Access (SC-FDMA) system. SC-FDMA is of a form in which a Frequency Division Multiple Access (FDMA) method is grafted onto a Single Carrier-Frequency Division Equalization (SC-FDE) method. The SC-FDMA method has a similar characteristic to the OFDMA method in that data is modulated and demodulated in the time domain and the frequency domain, but is advantageous in terms of low transmission power because Discrete Fourier Transform (DFT) is used and so the PAPR of a transmission signal is low. In particular, it can be said that the SC-FDMA method is advantageous in uplink communication in which a terminal sensitive to the transmission power in relation to the use of the battery performs communication to a base station. An important point when a terminal sends data to a base station is that the bandwidth of transmitted data is not great, but coverage in which power can be concentrated must be wide. An SC-FDMA system has a wider coverage than other systems when the same power amplifier is used because a variation in the signal is small. Meanwhile, in a clustered DFT-S-OFDM method unlike the SC-FDMA method, M(<N) symbol strings from among DFT-Spread (S) N symbol strings are allocated (or mapped) to contiguous subcarriers, and the remaining N-M symbol strings are allocated (or mapped) to contiguous subcarriers spaced apart from one another, from among subcarriers to which the M symbol strings have been allocated (or mapped). The clustered DFT-S-OFDM method is advantageous in that frequency selective scheduling can be performed.

In using the SC-FDMA method, however, attention must be paid to the satisfaction of a single carrier property. A wireless communication system must be able to provide transmission diversity to lower the PAPR by employing the SC-FDMA method or the clustered DFT-S-OFDM method. STBC (that is, one of the above transmission diversity schemes) is a scheme for obtaining a diversity gain by using selectivity in the space domain and the time domain. There is a need for an apparatus and method for transmitting data, in which the STBC scheme is used, but transmission diversity to lower the PAPR can be provided.

SUMMARY OF THE INVENTION

Accordingly, the present invention has been made in view of the above problems, and it is an object of the present invention to provide an apparatus and method for transmitting data, which are capable of lowering the PAPR, while providing transmission diversity using the STBC scheme, in a wireless communication system in which frequency hopping is generated.

According to an embodiment of the present invention, an apparatus for transmitting data in a wireless communication system is provided. The apparatus includes a data processor for generating modulation symbols by coding information bits and by constellation-mapping the coded information bits, a transmission (TX) processor for generating transmission symbols by applying any one of first and second transmission diversity schemes to the modulation symbols and for configuring a subframe including the transmission symbols, and a plurality of antennas for transmitting the subframe. The subframe comprises a plurality of slots and has a varying frequency band every slot by frequency hopping.

According to another embodiment of the present invention, a method of transmitting data in a wireless communication system is provided. The method includes configuring a subframe comprising a plurality of transmission symbols generated on the basis of any one of a normal Cyclic Prefix (CP) and an extended CP, and transmitting the subframe. Among the transmission symbols contiguous with each other in time domain and belonging to an identical frequency band, transmission symbols not forming a pair, from among the plurality of transmission symbols, are generated using a first transmission diversity scheme. And transmission symbols forming pairs, from among the plurality of transmission symbols, are generated using a second transmission diversity scheme.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
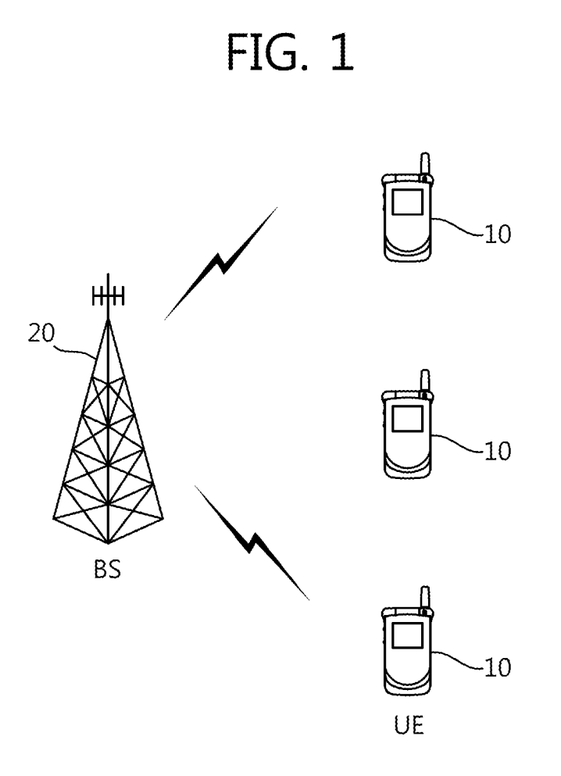
FIG. 1 is a diagram showing a wireless communication system.

FIG. 1 is a diagram showing a wireless communication system. The wireless communication systems are widely deployed in order to provide various communication services, such as voice and packet data.

Referring to FIG. 1, the wireless communication system includes User Equipments (UEs) 10 and a Base Station (BS) 20. The UE 10 may be fixed or mobile and may also be called another terminology, such as a Mobile Station (MS), a User Terminal (UT), a Subscriber Station (SS), or a wireless device. The BS 20 refers to a fixed station communicating with the UEs 10, and it may also be called another terminology, such as a node-B, a Base Transceiver System (BTS), or an access point. One or more cells may exist in one base station 20.

Multi-access schemes applied to the wireless communication system are not limited. The wireless communication system may be based on multiple-access methods, such as Code Division Multiple Access (CDMA), Time Division Multiple Access (TDMA), Frequency Division Multiple Access (FDMA), Single Carrier FDMA (SC-FDMA), Orthogonal Frequency Division Multiple Access (OFDMA), or other known modulation techniques. The above modulation schemes increase the capacity of a communication system by demodulating signals received from multiple users of the communication system.

The wireless communication system may be a multiple-antenna system. The multiple-antenna system may be a Multiple-Input Multiple-Output (MIMO) system. Alternatively, the multiple-antenna system may be Multiple-Input Single-Output (MISO) system, a Single-Input Single-Output (SISO) system, or a Single-Input Multiple-Output (SIMO) system. The MIMO system uses a plurality of transmission antennas and a plurality of reception antennas. The MISO system uses a plurality of transmission antennas and a single reception antenna. The SISO system uses one transmission antenna and one reception antenna. The SIMO system uses one transmission antenna and a plurality of reception antennas.

A Space Time Block Code (STBC) scheme, a Space Frequency Block Code (SFBC) scheme, a Frequency Switched Transmit Diversity (FSTD) scheme, a Cyclic Delay Diversity (CDD) scheme, a Time Switched Transmit Diversity (TSTD) scheme, a spatial multiplexing scheme, or a Precoding Vector Switching (PVS) scheme may be used as a multiple antenna transmission/reception scheme for operating the multiple-antenna system.

The STBC scheme is used to separate signals in the time and space domains, send the signals, and determine the signals received through respective antennas using a maximum likelihood combining scheme. The SFBC scheme is used to secure both a diversity gain and a multiple-user scheduling gain in a corresponding dimension by efficiently using selectivity in the space domain and the frequency domain. The FSTD scheme is used to classify a transmitted signal into multiple antennas according to the frequency. The TSTD scheme is used to classify a transmitted signal into multiple antennas according to the time. The spatial multiplexing scheme is used to raise the transmission rate by sending different data through respective antenna. The CDD scheme is used to obtain a diversity gain by using path delay between transmission antennas. The PVS scheme is kind of a transmission diversity scheme and used to obtain a random beamforming gain by switching a precoding vector (that is, weight) per certain time, slot, or symbol.

Hereinafter, downlink (DL) refers to communication from the BS 20 to the UE 10, and uplink (UL) refers to communication from the UE 10 to the BS 20. In downlink, a transmitter may be part of the BS 20 and a receiver may be part of the UE 10. In uplink, a transmitter may be part of the UE 10 and a receiver may be part of the BS 20.

A multiple-access method for downlink transmission may be different from a multiple-access method for uplink transmission. For example, an Orthogonal Frequency Division Multiple Access (OFDMA) method may be used as the multiple-access method for downlink transmission. A Single Carrier-Frequency Division Multiple Access (SC-FDMA) method or a clustered DFT-S-OFDM method may be used as the multiple-access method for uplink transmission. In a common SC-FDMA method, DFT-S symbol strings are allocated (or mapped) to contiguous subcarriers or subcarriers having equal distances. In the clustered DFT-S-OFDM method, M(<N) symbol strings from among DFT-S N symbol strings are allocated (or mapped) to contiguous subcarriers and the remaining N-M symbol strings are allocated (or mapped) to contiguous subcarriers spaced apart from one another, from among subcarriers to which the M symbol strings have been allocated (or mapped). The clustered DFT-S-OFDM method is advantageous in that frequency selective scheduling can be performed.

Hereinafter, a symbol processed and transmitted by a multiple-access method is referred to as a transmission symbol. The transmission symbols may include OFDM symbols, SC-FDMA symbols, and DFT-S-OFDM symbols. That is, a transmission symbol processed by the OFDM method is called an OFDM symbol, the transmission symbol processed by the SC-FMDA method is called an SC-FDMA symbol, and a transmission symbol processed by the clustered DFT-S-OFDM method is called a DFT-S-OFDM symbol.

Figure 2:
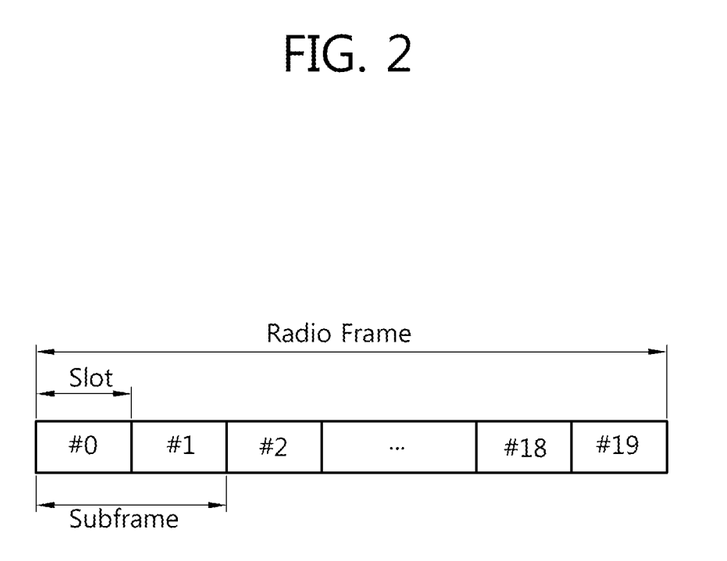
FIG. 2 shows an example of a radio frame structure.

FIG. 2 shows an example of a radio frame structure.

Referring to FIG. 2, the radio frame consists of 10 subframes. Each of the subframes may include 2 slots. One subframe is a 1 Transmission Time Interval (TTI), and the 1 TTI is 1 ms. Each of the slots is 0.5 ms in length. The slot may include a plurality of transmission symbols in the time domain and at least one subcarrier in the frequency domain. The slot may be said to be a unit for allocating radio resources in the time domain and the frequency domain. Frequency hopping may be generated every slot within a subframe. The term 'frequency hopping' refers to a case in which 2 contiguous slots belong to different frequency bands.

The number of transmission symbols included in one slot may vary according to the configuration of a Cyclic Prefix (CP). The CP includes an extended CP and a normal CP. For example, in case where the transmission symbols are composed on the basis of the normal CP, the number of transmission symbols included in one slot may be seven. In case where the transmission symbols are composed on the basis of the extended CP, the number of transmission symbols included in one slot is small as compared with the normal CP because the length of the transmission symbol is increased. For example, the number of transmission symbols included in one slot may be six. The extended CP may be used to further reduce inter-symbol interference in case where a channel condition is unstable as in the case where a UE moves at a fast speed or may be used to provide Multimedia Broadcast Multicast Service (MBMS).

The structure of the radio frame is only illustrative, and the number of subframes included in the radio frame, number of slots included in the subframe, and the number of transmission symbols included in the slot may be changed in various ways.

Figure 3:
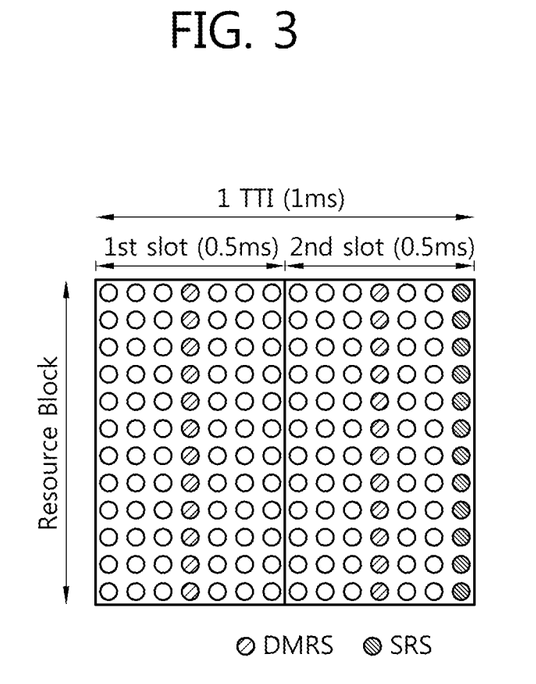
FIG. 3 shows an example of a subframe and shows a case where transmission symbols are composed on the basis of the normal CP.

FIG. 3 shows an example of a subframe and a case where transmission symbols are composed on the basis of the normal CP.

Referring to FIG. 3, the subframe includes two slots. Each of the slots includes 7 transmission symbols in the time domain because the transmission symbols are composed on the basis of the normal CP. Meanwhile, a plurality of resource blocks (RB) is included in the frequency domain. A unit composed of one transmission symbol and one subcarrier is called a resource element. Assuming that one resource block includes 12 subcarriers, one resource block includes 12×7 resource elements.

Data or an uplink reference signal may be carried on each transmission symbol. There are two kinds of uplink reference signals. One of the uplink reference signals is used to estimate a channel in order to demodulate uplink data, and the other of the uplink reference signals is used to schedule the frequency domain of uplink by checking a channel condition of uplink. The former reference signal is called a data demodulation reference signal (hereinafter referred to as a DMRS'), and the latter reference signal is called a scheduling reference signal or a sounding reference signal (hereinafter referred to as an 'SRS'). The DMRS is transmitted in a limited frequency domain only when there is data transmitted in uplink, whereas the SRS is periodically transmitted through the entire frequency band of uplink irrespective of whether data exists or not.

In each slot, one transmission symbol is allocated in order to send the DMRS. The SRS may be carried on the last transmission symbol of a second slot of each subframe. Assuming that the remaining transmission symbols are allocated to send data, 6 transmission symbols are allocated to a first slot in order to send data, and 5 transmission symbols are allocated to a second slot in order to send data. In order for the STBC scheme to be used, transmission symbols have to be even-numbered in pairs. In the case of the first slot, the transmission symbols can be paired because the number of transmission symbols on which data is carried is 6. Meanwhile, in the case of the second slot, 4 transmission symbols can be paired every two symbols because the number of transmission symbols on which data is carried is 5, but the remaining one transmission symbol cannot be paired. In order to send data in one transmission symbol not paired as described above, another transmission diversity scheme, not requiring that transmission symbols be paired, may be used. For example, schemes, such as CDD, PVS, and FSTD, may be used.

The structure of the subframe is only illustrative. Furthermore, the number of slots included in each subframe, the number of transmission symbols included in each slot, and the location of a transmission symbol in which the DMRS is transmitted may be changed in various ways.

Figure 4:
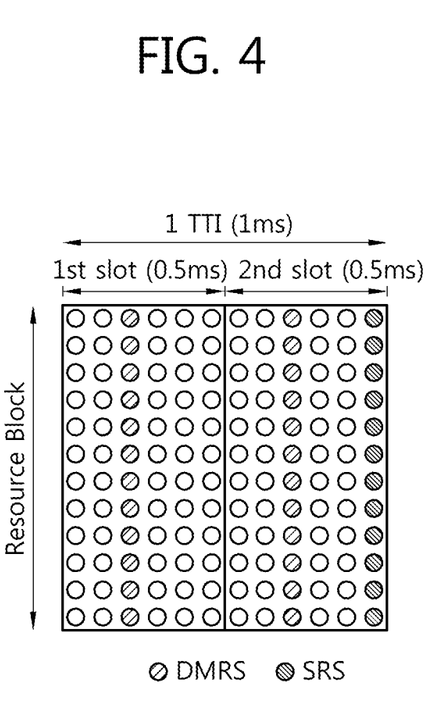
FIG. 4 shows another example of a subframe and a case where transmission symbols are composed on the basis of the extended CP.

FIG. 4 shows another example of a subframe and a case where transmission symbols are composed on the basis of the extended CP.

Unlike the structure of the subframe shown in FIG. 3, in the structure of the subframe shown in FIG. 4, one slot includes 6 transmission symbols in the time domain because the transmission symbols are composed on the basis of the extended CP. Accordingly, one subframe includes a total of 12 transmission symbols. In each slot, one transmission symbol is allocated to send the DMRS. The SRS may be carried on the last transmission symbol of a second slot. Assuming that data is allocated to the remaining transmission symbols, 5 transmission symbols are allocated to a first slot in order to send data, and 4 transmission symbols are allocated to a second slot in order to send data. In the case of the first slot, 4 transmission symbols are paired every two symbols because data is carried on the 5 transmission symbols, but the one last transmission symbol cannot be paired. Meanwhile, in the case of the second slot, the 4 transmission symbols can be paired every two symbols because data is carried on the 4 transmission symbols.

If there is no frequency hopping between slots, the STBC scheme may be applied to the last transmission symbol of the first slot and the first transmission symbol of the second slot because the last transmission symbol and the first transmission symbol belong to the same frequency band and are temporally contiguous to each other. If frequency hopping is generated between slots, the STBC scheme cannot be applied to the last transmission symbol of the first slot and the first transmission symbol of the second slot because the last transmission symbol and the first transmission symbol belong to different frequency bands although they are temporally contiguous to each other. If frequency hopping is generated, another transmission diversity scheme, not requiring that transmission symbols be paired, may be used in order to send data in the last transmission symbol of the first slot. For example, schemes, such as CDD, PVS, and FSTD, may be used.

The structure of the subframe is only illustrative. Furthermore, the number of slots included in the subframe, the number of transmission symbols included in the slot, and the location of a transmission symbol in which the DMRS is transmitted may be changed in various ways.

Figure 5:
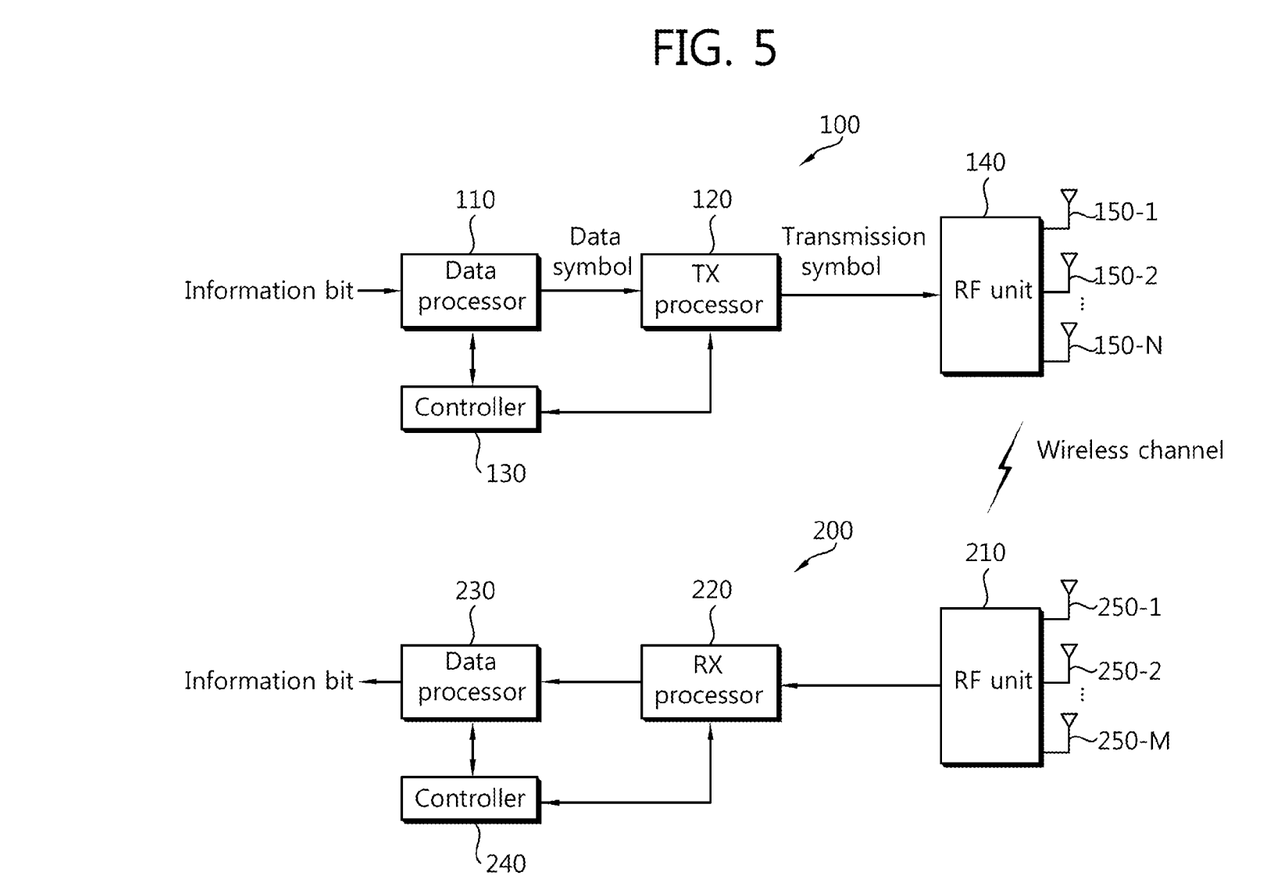
FIG. 5 is an explanatory diagram showing a wireless communication system to which the STBC scheme is applied.

FIG. 5 is an explanatory diagram showing a wireless communication system to which the STBC scheme is applied.

Referring to FIG. 5, the wireless communication system to which the STBC scheme is applied includes a transmitter 100 and a receiver 200. The transmitter 100 includes a data processor 110, a TX processor 120, a controller 130, a Radio Frequency (RF) unit 140, and transmission antennas 150-1 and 150-2 to 150-N.

The data processor 110 generates codeword by performing channel coding on received information bits and generates modulation symbols by performing constellation mapping on the codewords. The information bits include information about a user plane which will be sent to the receiver 200. Furthermore, the information bits may include information about a control plane which is related to the transmission of information about a user plane or to the allocation of radio resources.

The TX processor 120 configures a subframe and generates transmission symbols by applying a transmission diversity scheme to the modulation symbol according to the configured subframe. The TX processor 120 may apply a different transmission diversity scheme to each transmission symbol. For example, the TX processor 120 may generate a first transmission symbol by applying a first transmission diversity scheme to a first modulation symbol and generate a second transmission symbol by applying a second transmission diversity scheme to a second modulation symbol. The first transmission diversity scheme may be the STBC scheme. The second transmission diversity scheme may be a transmission diversity scheme (for example, CDD, FSRD, or PVS) other than the STBC scheme. The transmission symbol differs according to a multiple-access method. For example, the transmission symbol may be called an OFDM symbol in the case of the OFDM method, and the transmission symbol may be called an SC-FDMA symbol in the case of the SC-FDMA method.

The controller 130 controls the operations of the data processor 110 and the TX processor 120. The RF unit 140 transforms a received transmission symbol into an analog signal. The transformed analog signal is propagated to wireless channels through the transmission antennas 150-1 and 150-2 to 150-N.

The receiver 200 includes an RF unit 210, an RX processor 220, a data processor 230, a controller 240, and reception antennas 250-1 and 250-2 to 250-M.

The RF unit 210 transforms a signal, received through the reception antennas 250-1 and 250-2 to 250-M, into a digital signal. The RX processor 220 performs an operation, corresponding to the TX processor 120, on the digital signal and outputs a data symbol. The data processor 230 restores information bits from the data symbol. The controller 240 controls the operations of the RX processor 220 and the data processor 230.

Figure 6:
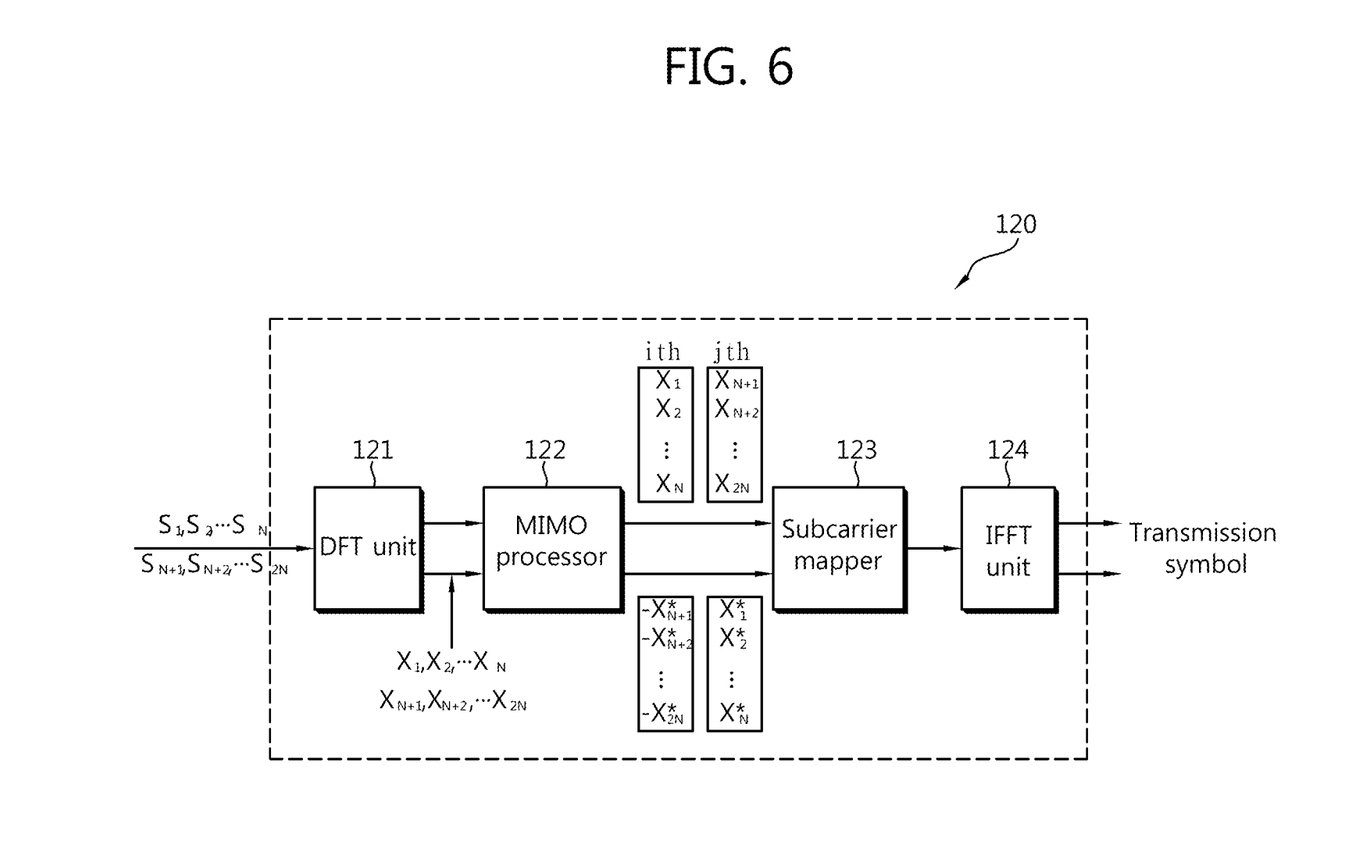
FIG. 6 is a block diagram showing an example of the TX processor.

FIG. 6 is a block diagram showing an example of the TX processor 120. It is assumed that the number of transmission antennas is 2. Furthermore, it is assumed that the TX processor 120 is a unit in an SC-FDMA system including a Discrete Fourier Transform (DFT) unit and an Inverse Fast Fourier Transform (IFFT) unit, but the assumption is only illustrative. For example, the TX processor may be a unit according to other multiple-access method (for example, a unit according to an OFDM system or a DFT-S-OFDM system).

Referring to FIG. 6, the TX processor 120 includes a DFT unit 121 for performing DFT, an MIMO processor 122, a subcarrier mapper 123, and an IFFT unit 124 for performing IFFT.

The DFT unit 121 outputs frequency domain symbol strings $X_1, X_2$ to $X_N$, and $X_{N+1}$ to $X_{2N}$ by performing DFT on an 2N number of received data symbol strings $S_1, S_2$ to $S_N$, and $S_{N+1}$ to $S_{2N}$. If the size of DFT is N, every N data symbol strings are subjected to DFT-spreading at one time. The data symbol strings inputted to the DFT unit 121 may be information about a control plane or information about a user plane or both. The size of DFT may be fixed according to the size of allocated resource blocks or may be variable according to systems.

The MIMO processing unit 122 performs precoding on the frequency domain symbol strings by using a first or second transmission diversity scheme. The first transmission diversity scheme is applied to an even number forming a symbol pair (for example, two transmission symbols). The symbol pair has the same frequency band and refers to a pair of temporally adjacent transmission symbols. Data is carried on the symbol pair, but a reference signal is not carried on the symbol pair. The second transmission diversity scheme is applied to a transmission symbol (for example, one transmission symbol) not forming the symbol pair, but forming a non-symbol pair. The first transmission diversity scheme may be the STBC scheme, and the second transmission diversity scheme may be a transmission diversity scheme, such as CDD, FSTD, or PVS.

In order to use the STBC scheme in an SC-FDMA system, the single carrier property has to be satisfied. In order for the single carrier property to be satisfied, transmission symbols of the same frequency band need to be paired. However, in case where transmission symbols within one slot are not paired, the STBC scheme cannot be applied to the SC-FDMA system because the single carrier property is not satisfied in the SC-FDMA system. In order to solve the problem, the STBC scheme may be applied to the symbol pair having the same frequency band and temporally adjacent to each other, and a transmission diversity scheme, such as CDD, FSTD, or PVS, may be applied to the non-symbol pair having a different frequency band. In this case, there are not only an effect of a spatial diversity gain according to the STBC scheme, but also an effect of a frequency diversity gain in case where resource blocks having different frequency bands are allocated because frequency hopping is supported.

The subcarrier mapper 123 maps time space block codewords $(X_1, X_2$ to $X_N)$, $(-X^*_{N+1}, -X^*_{N+2}$ to $-X^*_{2N})$, $(X_{N+1}, X_{N+2}$ to $X_{2N})$, and $(X^*_1, X^*_2$ to $X^*_N)$ to respective subcarriers allocated on the basis of scheduling information. The allocated subcarriers are located in the same frequency band without being subjected to frequency hopping every slot. For example, in case where a plurality of resource blocks is allocated to a transmitter, resource blocks occupy the same frequency band on consecutive slots. Here, the resource block refers to physical resources including a plurality of subcarriers.

The IFFT unit 124 outputs an SC-FDMA symbol (that is, time domain symbol) by performing IFFT on the subcarriers to which the time space block codewords have been mapped. An $i^{th}$ SC-FDMA symbol and a $j^{th}$ SC-FDMA symbol are generated according to the sequence of time. Although only one IFFT unit 124 is shown, this is only illustrative. For example, the number of IFFT units 124 may vary according to the number of transmission antennas. A method of combining DFT and IFFT and performing modulation using the combined DFT and IFFT is called SC-FDMA. The SC-FDMA method is advantageous in that it lowers the PAPR as compared with the OFDM method using only IFFT because it has the single carrier property.

Hereinafter, the transmission diversity scheme used in the MIMO processing unit 122 is described in detail.

For example, a method of performing precoding using the STBC scheme (that is, the first transmission diversity scheme) is described below.

The time space block codes $(X_1, X_2$ to $X_N)$, $(-X^*_{N+1}, -X_{N+2}$ to $-X^*_{2N})$, $(X_{N+1}, X_{N+2}$ to $X_{2N})$, and $(X^*_1, X^*_2$ to $X^*_N)$] are generated by blocking the frequency domain symbol strings $X_1, X_2$ to $X_N$, and $X_{N+1}$ to $X_{2N}$ for every antenna and time according to the STBC scheme. The first time space block code strings $(X_1, X_2$ to $X_N)$ and $(-X^*_{N+1}, -X_{N+2}$ to $-X^*_{2N})$ correspond to the subcarriers of the $i^{th}$ SC-FDMA symbol, and the second time space block code strings $(X_{N+1}, X_{N+2}$ to $X_{2N})$ and $(X^*_1, X^*_2$ to $X^*_N)$ correspond to the subcarriers of the $j^{th}$ SC-FDMA symbol (i<j). The time space block codes processed by the MIMO processing unit 123 are defined by a transmission matrix G (that is, a size $p \times n_T$). Here, p is the length of the time space block code, and $n_T$ is the number of transmission antennas. G consists of a linear combination of symbols $x_1, x_2$ to $x_p$ and a complex conjugate of the symbols. Different codewords are transmitted through respective transmission antenna at the same time. A transmission matrix G in an STBC system in which the length of the time space block code is 2 and two transmission antennas exist is expressed by Equation 1 below.

$$G = \begin{bmatrix} x_1 & x_2 \\ \sim x_2^* & x_1^* \end{bmatrix} \text{ or } G = \begin{bmatrix} x_1 & -x_2^* \\ x_2 & x_1^* \end{bmatrix} \qquad \text{[Equation 1]}$$

Here, in the case of $$G = \begin{bmatrix} x_1 & x_2 \\ -x_2^* & x_1^* \end{bmatrix},$$

a mapping relationship between generated time space block code strings, transmission antennas, SC-FDMA symbols is listed in Table 1.

TABLE 1

|  | $i^{th}$ SC-FDMA Symbol | $j^{th}$ SC-FDMA Symbol |
|---|---|---|
| FIRST TRANSMISSION ANTENNA | $X_1, X_2$ to $X_N$ | $X_{N+1}, X_{N+2}$ to $X_{2N}$ |
| SECOND TRANSMISSION ANTENNA | $-X^*_{N+1}, -X^*_{N+2}$ to $-X^*_{2N}$ | $X^*_1, X^*_2$ to $X^*_N$ |

Referring to Table 1, the first time space block code strings $(X_1, X_2$ to $X_N)$ and $(-X^*_{N+1}, -X_{N+2}$ to $-X^*_{2N})$ are mapped to the $i^{th}$ SC-FDMA symbol. From among them, the time space block code strings $(X_1, X_2$ to $X_N)$ are transmitted through the first transmission antenna, and the time space block code strings $(-X^*_{N+1}, -X^*_{N+2}$ to $-X^*_{2N})$ are transmitted through the second transmission antenna. Furthermore, the second time space block code strings $(X_{N+1}, X_{N+2}$ to $X_{2N})$ and $(X^*_1, X^*_2$ to $X^*_N)$ are mapped to the $j^{th}$ SC-FDMA symbol. From among them, the time space block code strings $(X_{N+1}, X_{N+2}$ to $X_{2N})$ are transmitted through the first transmission antenna, and the time space block code strings $(X^*_1, X^*_2$ to $X^*_N)$ are transmitted through the second transmission antenna.

For another example, a method of performing precoding according to the CCD scheme (that is, one of the second transmission diversity schemes) is described below.

The CDD scheme is used to obtain a diversity gain by employing path delay between transmission antennas. In relation to the CDD scheme, precodings for spatial multiplexing include precoding supporting the CDD scheme and precoding not supporting the CDD scheme. The precoding not supporting the CDD scheme may be referred to as precoding without CDD, and the precoding supporting the CDD scheme may be referred to as precoding for CDD.

The precoding not supporting the CDD scheme is defined by Equation 2 below.

$$\begin{bmatrix} y^{(0)}(i) \\ \vdots \\ \vdots \\ y^{(P-1)}(i) \end{bmatrix} = W(i) \begin{bmatrix} x^{(0)}(i) \\ \vdots \\ \vdots \\ x^{(v-1)}(i) \end{bmatrix} \qquad \text{[Equation 2]}$$

Referring to Equation 2, $x(i)=[x^{(0)}(i)$ to $x^{(u-1)}(i)]^T$ is a vector inputted to a precoder, $y(i)=[y^{(0)}(i)$ to $y^{(P-1)}(i)]^T$ is a vector mapped to resources for each transmission antenna, and W(i) is a precoding matrix of a size P u. Here, u is the number of layers, i=0, 1 to $M^{layer}_{symb}-1$ is the number of modulation symbols per layer ($M^{layer}_{symb}$ is the same as $M^{antenna}_{symb}$ (i.e., the number of modulation symbols for each antenna)), and $y^{(P)}(i)$ is a signal for a $P^{th}$ transmission antenna. Accordingly, if the number of transmission antennas is 1, $y^{(P)}(i)=x^{(0)}(i)$. For spatial multiplexing, a value of W(i) may be selected from among precoder elements in codebooks.

Meanwhile, the precoding supporting the CDD scheme is defined by Equation 3 below.

$$\begin{bmatrix} y^{(0)}(i) \\ \vdots \\ \vdots \\ y^{(P-1)}(i) \end{bmatrix} = W(i)D(i)U \begin{bmatrix} x^{(0)}(i) \\ \vdots \\ \vdots \\ x^{(v-1)}(i) \end{bmatrix} \qquad \text{[Equation 3]}$$

Referring to Equation 3, x(i), y(i), and W(i) are the same as those of Equation 1. i=0, 1 to $M^{antenna}_{symb}-1$ is the number of modulation symbols per antenna, and a matrix D(i) and a matrix U are regular matrices of a size u u supporting the CDD scheme and may be defined as in Table 2 according to the number of layers u.

TABLE 2

| Number of layers v | U | D(i) |
|---|---|---|
| 1 | $[1]$ | $[1]$ |
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

Alternatively, the matrix D(i) may be defined by a delay value, such as that defined by Equation 4 below.

$$[1 e^{-j\theta_2 k} \ldots e^{-j\theta_{Nt} k}]^T \qquad \text{[Equation 4]}$$

Here, a phase component $\theta$ is defined by Equation 5 below.

$$\theta = \frac{2\pi \times a}{N} \qquad \text{[Equation 5]}$$

Here, $\alpha$ is a delay component, and N is a certain integer. In case where $\alpha$ is an integer, $\alpha=N/M$ and M may be the number of transmission antennas. In case where $\alpha$ is a decimal, there is an advantage in that a beamforming gain can be obtained because a small delay value ($\alpha<1$) is used. In case where frequency hopping is not generated every slot, a different $\alpha$ value may be used every slot. If a different a value is used every slot as described above, a uniform beamforming gain can be obtained.

For another example, a method of performing precoding according to the FSTD scheme (that is, another of the second transmission diversity schemes) is described below.

In case where transmission diversity is implemented according to the FSTD scheme in an SC-FDMA system, in order to satisfy the single carrier property, frequency resources have to be allocated as follows. That is, the frequency resources (or subcarriers) need to be allocated to each transmission antenna in an interleaved way or a localized way within the frequency band in which the frequency resources are localized and allocated.

When the FSTD scheme is applied to an SC-FDMA system, a DFT spreading method and a method of mapping physical resources are as follows. First, there is a case where a multiple-DFT block is used. In this case, data transmitted through each transmission antenna may be subjected to DFT spreading in the unit of a virtual antenna or a physical antenna which is mapped to a transmission antenna. In each virtual antenna (or physical antenna), DFT-spread symbol strings are mapped to the resources of each physical antenna. In case where data is mapped to the virtual antenna, if a precoding matrix is an identity matrix, it is equivalent to mapping to the physical antenna.

Second, there is a case where a single DFT block is used. In this case, a modulation symbol is repeated N times in the unit of 1/N of a DFT size, thus generating symbol strings. The generated symbol strings are subjected to DFT spreading. The DFT-spread signals become interleaved signals having N intervals. The spread symbol strings are mapped to physical resources.

For another example, a method of performing precoding according to the PVS scheme (that is, yet another of the second transmission diversity schemes) is described below.

The PVS scheme is used to obtain a random beamforming gain by switching a precoding vector. A different precoding vector may be used every slot (or SC-FDMA symbol pair). The random beamforming gain can be expected by using the different vector every slot. In particular, a specially determined precoding vector may be applied to the non-symbol pair. It means that a different precoding vector can be applied to the non-symbol pair of each slot. A subset from rank 1 precoding weights defined as codebooks as in Table 3 may be used as the precoding vector used in the PVS scheme.

TABLE 3

| codebook index | weight vector |
|---|---|
| 0 | $\frac{1}{\sqrt{2}}\begin{bmatrix} 1 \\ 1 \end{bmatrix}$ |
| 1 | $\frac{1}{\sqrt{2}}\begin{bmatrix} 1 \\ -1 \end{bmatrix}$ |
| 2 | $\frac{1}{\sqrt{2}}\begin{bmatrix} 1 \\ j \end{bmatrix}$ |
| 3 | $\frac{1}{\sqrt{2}}\begin{bmatrix} 1 \\ -j \end{bmatrix}$ |

Figure 7:
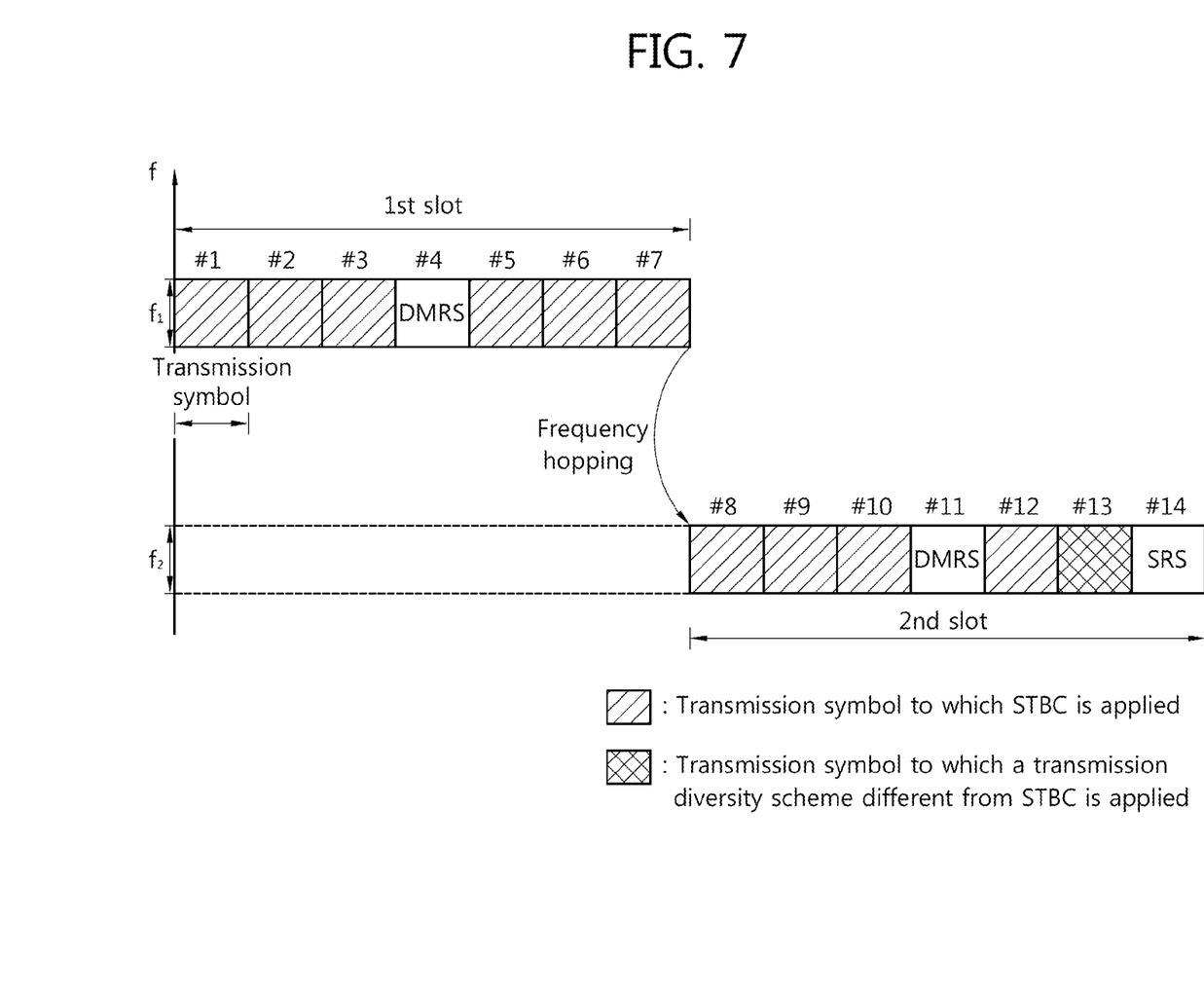
FIG. 7 is a diagram illustrating a method using a transmission diversity scheme according to an example of the present invention.

FIG. 7 is a diagram illustrating a method using a transmission diversity scheme according to an example of the present invention. FIG. 7 corresponds to a case where transmission symbols are composed on the basis of the normal CP.

Referring to FIG. 7, a subframe includes a total of 14 transmission symbols. A DMRS is carried on fourth and eleventh transmission symbols, and an SRS is carried on the fourteenth transmission symbol. A first slot is located in a frequency band $f_1$, and a second slot is located in a frequency band $f_2$. Frequency hopping is generated when the first slot and the second slot have different frequency bands as described above.

Data is carried on the remaining transmission symbols other than the fourth, eleventh, and fourteen transmission symbols. Here, the data may be information about a user plane or a control plane. Hereinafter, a symbol pair of an $i^{th}$ transmission symbol and a $j^{th}$ transmission symbol is expressed by (#i, #j).

In the first slot, all the transmission symbols can form symbol pairs because the number of transmission symbols for data is 6 (that is, an even number). The symbol pairs are (#1, #2), (#3, #5), and (#6, #7). In case where a reference signal, such as a DMRS or an SRS, exists between the $i^{th}$ transmission symbol and the $j^{th}$ transmission symbol, the symbol pairs are temporally not contiguous with each other. In this case, j=i+2. Meanwhile, in case where the $i^{th}$ transmission symbol and the $j^{th}$ transmission symbol are contiguous with each other, the symbol pairs are temporally consecutive to each other. In this case, j=i+1. The STBC scheme (that is, the first transmission diversity scheme) may be applied to the transmission symbols forming the symbol pairs as described above. This is because the transmission symbols belong to the same frequency band and are temporally contiguous with each other.

On the other hand, in the second slot, one transmission symbol cannot form a symbol pair because the number of transmission symbols for data is 5 (that is an odd number). The thirteenth transmission symbol cannot become a symbol pair because possible symbol pairs are (#8, #9) and (#10, #12). The STBC scheme (that is, the first transmission diversity scheme) may be applied to the symbol pair, but may not be applied to the non-symbol pair. This is because the single subcarrier property is broken. Accordingly, at least one of the FSTD, PVS, and CDD schemes (that is, second transmission diversity scheme) may be applied to the thirteenth transmission symbol.

Figure 8:
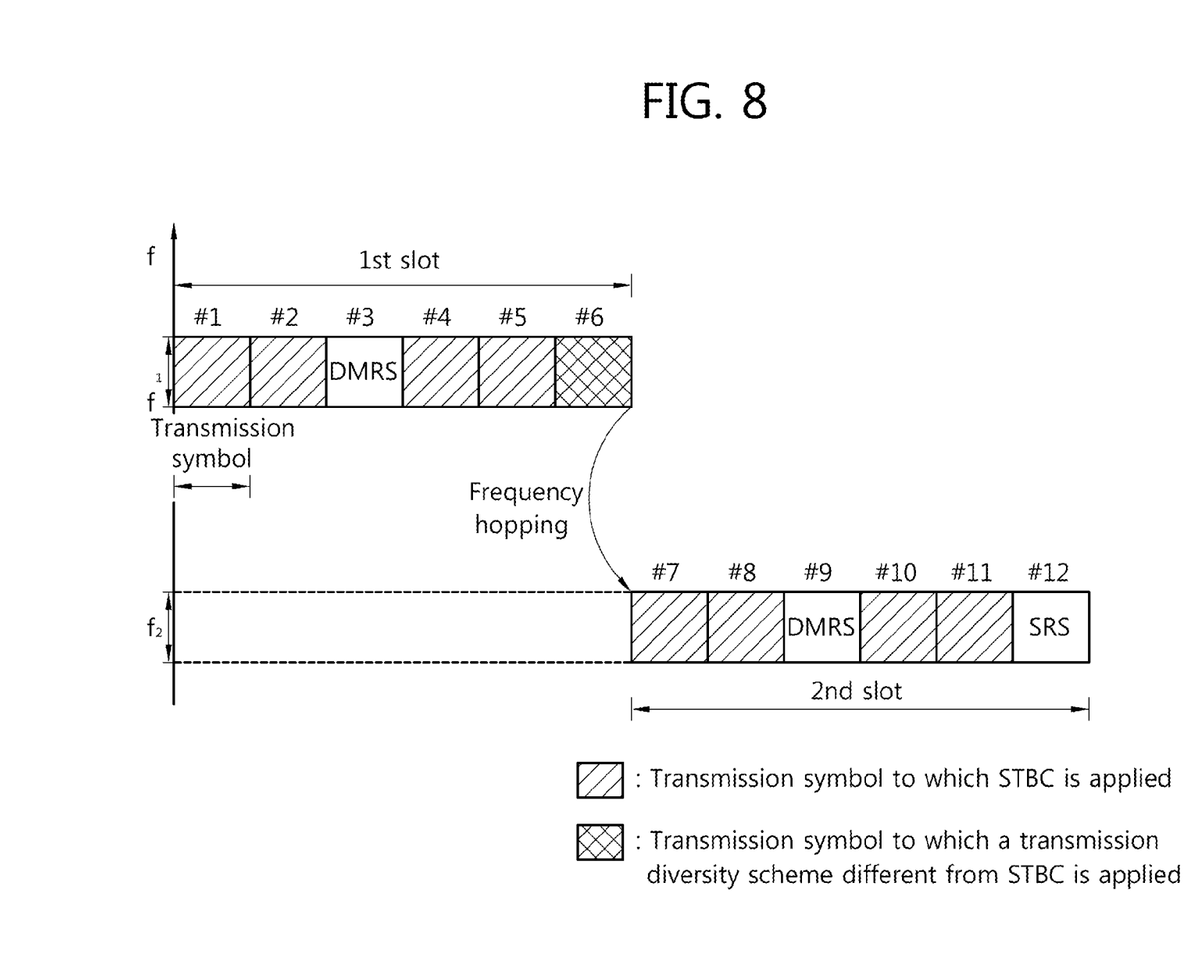
FIG. 8 is a diagram illustrating a method using a transmission diversity scheme according to another example of the present invention.

FIG. 8 is a diagram illustrating a method using a transmission diversity scheme according to another example of the present invention. FIG. 8 corresponds to a case where transmission symbols are composed on the basis of the extended CP.

Referring to FIG. 8, a subframe includes a total of 12 transmission symbols. A DMRS is carried on third and ninth transmission symbols, and an SRS is carried on a twelfth transmission symbol. Data is carried on the remaining transmission symbols.

In a first slot, one transmission symbol cannot form a symbol pair because the number of transmission symbols for data is 5 (that is, an odd number). A sixth transmission symbol cannot become a symbol pair because possible symbol pairs are (#1, #2) and (#4, #5). The STBC scheme (that is, the first transmission diversity scheme) may be applied to the symbol pair. However, at least one of the FSTD, PVS, and CDD schemes (that is, the second transmission diversity scheme) is applied to the non-symbol pair.

Meanwhile, in a second slot, all the transmission symbols can form symbol pairs because the number of transmission symbols for data is 4 (that is, an even number). The symbol pairs are (#7, #8) and (#10, #11). Accordingly, the STBC scheme (that is, the first transmission diversity scheme) may be applied to all the transmission symbols belonging to the second slot.

Figure 9:
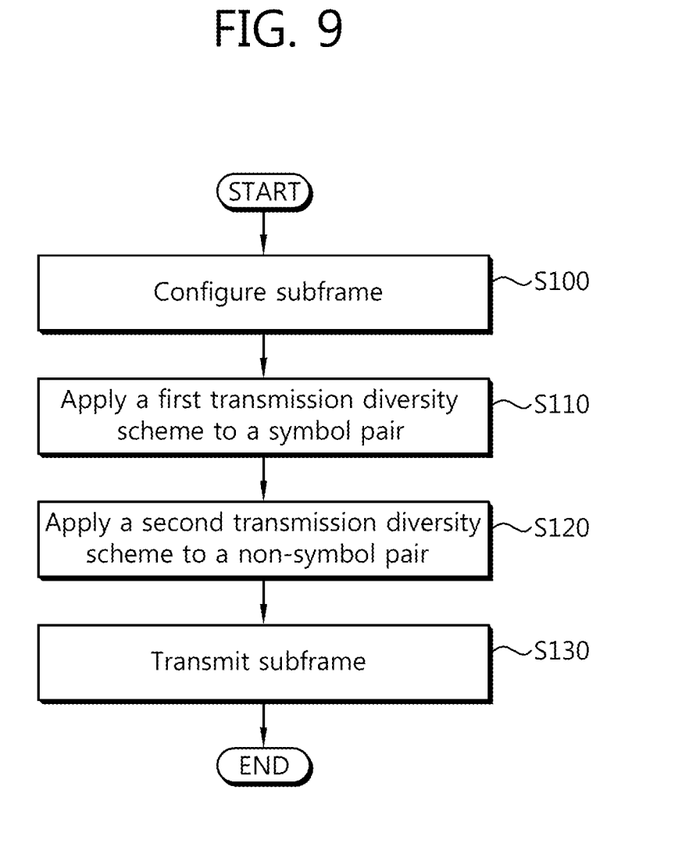
FIG. 9 is a flowchart illustrating a method of transmitting data using a transmission diversity scheme according to the present invention.

FIG. 9 is a flowchart illustrating a method of transmitting data using a transmission diversity scheme according to the present invention.

Referring to FIG. 9, a subframe is configured at step S100. The subframe includes a plurality of slots. Each of the slots belongs to a different frequency band because of frequency hopping. The number of transmission symbols belonging to the slot is variable according to the configuration of the transmission symbols (that, is then length of a CP). For example, in case where transmission symbols are composed on the basis of the normal CP, one slot includes 7 transmission symbols. In case where transmission symbols are composed on the basis of the extended CP, one slot includes 6 transmission symbols. A method of configuring a subframe according to which CP may be changed according to a channel condition or the type of wireless communication service. For example, in case where MBMS is provided or a channel condition is very weak, a subframe may be configured on the basis of the extended CP. On the other hand, in case where a channel condition is excellent, a subframe may be configured on the basis of the normal CP. The configuration of the subframe may be performed by the scheduling of a BS or may be determined by a BS which previously sends configuration information of the subframe to a UE.

In configuring a subframe, a DMRS and an SRS (that is, uplink reference signals) may be taken into consideration. This is because the number of transmission symbols on which data can be carried is changed according to the number of transmission symbols on which the DMRS and the SRS are carried. If symbol pair is performed using the remaining transmission symbols other than the transmission symbols on which the DMRS and the SRS are carried, a symbol pair and a non-symbol pair exist within a subframe.

The first transmission diversity scheme is applied to transmission symbols forming symbol pairs, from among the transmission symbols of the configured subframe at step S110. The first transmission diversity scheme is used to pair the transmission symbols in order to satisfy the single carrier property. The STBC scheme is included in the first transmission diversity scheme.

The second transmission diversity scheme is applied to transmission symbols not forming symbol pairs, from among the transmission symbols of the configured subframe at step S120. The second transmission diversity scheme can satisfy the single carrier property although transmission symbols are not paired. The second transmission diversity scheme may be at least one of the FSTD, PVS, and CDD schemes.

The subframe composed of the transmission symbols processed using the first and second transmission diversity schemes is transmitted at step at step S130.

The PAPR can be lowered, a single carrier property can be maintained, and a uniform gain according to each transmission diversity scheme can be obtained.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for transmitting data in a wireless communication system, the apparatus comprising:
    a data processor configured to generate modulation symbols by coding information bits and by constellation-mapping the coded information bits, the modulation symbols being transmitted via a subframe including a first slot and a second slot following the first slot, each of the first slot and the second slot including a user data modulation symbol not carrying a reference signal and a reference modulation symbol carrying a reference signal, the first slot being transmitted via a first frequency band, the second slot being transmitted via a second frequency band;
    a transmission (TX) processor configured to:
        apply a first transmission diversity scheme to user data modulation symbols of the first slot which are paired;
        apply a second transmission diversity scheme to a user data modulation symbol of the first slot which is not paired;
        apply the first transmission diversity scheme to user data modulation symbols of the second slot which are paired; and
        apply the second transmission diversity scheme to a user data modulation symbol of the second slot which is not paired; and
    a plurality of antennas configured to transmit the subframe, wherein the reference signal includes at least one of Data deModulation Reference Signal (DMRS) and Sounding Reference Signal (SRS), wherein the SRS is only included in a last modulation symbol of the second slot, and wherein the DMRS is included in the first slot and the second slot.

2. The apparatus of claim 1, wherein the first transmission diversity scheme is a Space Time Block Code (STBC) scheme for separating the modulation symbols in time and space domains and for coding the separated modulation symbols.

3. The apparatus of claim 1, wherein the second transmission diversity scheme is a Frequency Switched Transmit Diversity (FSTD) scheme for separating the modulation symbols into the plurality of antennas according to frequencies and for allocating the separated modulation symbols.

4. The apparatus of claim 1, wherein the second transmission diversity scheme comprises a Cyclic Delay Diversity (CDD) scheme for obtaining diversity by employing path delay between the plurality of antennas.

5. The apparatus of claim 1, wherein the second transmission diversity scheme is a Precoding Vector Switching (PVS) scheme for changing a precoding matrix at a predetermined time interval and for precoding the changed precoding matrix.

6. The apparatus of claim 1, wherein the wireless communication system comprises a Single Carrier-Frequency Division Multiple Access (SC-FDMA) system.

7. The apparatus of claim 1, wherein the wireless communication system comprises a clustered DFT-S-OFDM system for frequency selective scheduling.

8. The apparatus of claim 1, wherein the first slot includes two user data modulation symbols to which the first transmission diversity scheme is applied, which are directly followed by a single reference modulation symbol carrying the DMRS to which any diversity scheme is not applied, which is directly followed by the two user data modulation symbols to which the first transmission diversity scheme is applied, which is followed by a single user data modulation symbol to which the second transmission diversity scheme is applied.

9. The apparatus of claim 1, wherein the first slot includes three user data modulation symbols to which the first transmission diversity scheme is applied, which are directly followed by a single reference modulation symbol carrying the DMRS to which any diversity scheme is not applied, which is directly followed by the three user data modulation symbols to which the first transmission diversity scheme is applied.

10. The apparatus of claim 1, wherein the second slot includes two user data modulation symbols to which the first transmission diversity scheme is applied, which are directly followed by a single reference modulation symbol carrying the DMRS to which any diversity scheme is not applied, which is directly followed by the two user data modulation symbols to which the first transmission diversity scheme is applied, which is followed by a single reference modulation symbol carrying the SRS to which any diversity scheme is not applied.

11. The apparatus of claim 1, wherein the second slot includes three user data modulation symbols to which the first transmission diversity scheme is applied, which are directly followed by a single reference modulation symbol carrying the DMRS to which any diversity scheme is not applied, which is directly followed by the single user data modulation symbol to which the first transmission diversity scheme is applied, which is directly followed by a single user data modulation symbol to which the second transmission diversity scheme is applied, which is followed by a single reference modulation symbol carrying the SRS to which any diversity scheme is not applied.

\* \* \* \* \*